United States Patent [19]

Lehnert et al.

[11] Patent Number: 5,319,900

[45] Date of Patent: * Jun. 14, 1994

[54] FINISHING AND ROOF DECK SYSTEMS CONTAINING FIBROUS MAT-FACED GYPSUM BOARDS

[75] Inventors: Charles W. Lehnert, Fort Myers, Fla.; Brian G. Randall, Stone Mountain, Ga.

[73] Assignee: Georgia-Pacific Corporation, Atlanta, Ga.

[*] Notice: The portion of the term of this patent subsequent to Jun. 22, 2010 has been disclaimed.

[21] Appl. No.: 58,898

[22] Filed: May 6, 1993

Related U.S. Application Data

[60] Division of Ser. No. 725,946, Jun. 27, 1991, Pat. No. 5,220,762, which is a continuation of Ser. No. 481,710, Feb. 15, 1990, abandoned, which is a continuation of Ser. No. 262,229, Oct. 21, 1988, abandoned, which is a continuation of Ser. No. 769,582, Aug. 26, 1985, abandoned, which is a continuation-in-part of Ser. No. 583,874, Feb. 27, 1984, Pat. No. 4,647,496.

[51] Int. Cl.[5] .............................................. E04B 2/04
[52] U.S. Cl. ..................................... 52/408; 106/772; 106/781
[58] Field of Search ............. 52/309.1, 309.12, 309.17, 52/408, 481, 809; 106/111, 116, 772, 778, 781

[56] References Cited

U.S. PATENT DOCUMENTS

| | | |
|---|---|---|
| 1,787,163 | 12/1930 | New . |
| 2,206,042 | 7/1940 | Novak . |
| 2,238,017 | 4/1941 | Duncan . |
| 2,560,521 | 7/1951 | Camp . |
| 2,633,441 | 3/1953 | Buttress . |
| 2,954,302 | 9/1960 | Gorman . |
| 3,185,297 | 5/1965 | Rutledge . |
| 3,284,980 | 11/1966 | Dinkel . |
| 3,289,371 | 12/1966 | Pearson et al. . |
| 3,391,037 | 7/1968 | McNulty . |
| 3,455,710 | 7/1969 | Nitzsche et al. ..................... 106/111 |
| 3,607,486 | 9/1971 | Jacks et al. . |
| 3,830,687 | 8/1974 | Re et al. . |
| 3,929,947 | 12/1975 | Schwartz . |
| 3,935,021 | 1/1976 | Greve et al. . |

(List continued on next page.)

FOREIGN PATENT DOCUMENTS

| | | |
|---|---|---|
| 721719 | 11/1965 | Canada . |
| 794590 | 9/1968 | Canada . |
| 993779 | 7/1976 | Canada . |
| 1033123 | 6/1958 | Fed. Rep. of Germany . |
| 2008744 | 2/1970 | Fed. Rep. of Germany . |
| 7806114 | 3/1978 | Fed. Rep. of Germany . |
| 2808723 | 9/1979 | Fed. Rep. of Germany . |
| 155679 | 12/1971 | New Zealand . |
| 772581 | 4/1957 | United Kingdom . |
| 1204541 | 9/1970 | United Kingdom . |
| 1520411 | 8/1978 | United Kingdom . |
| 2004807 | 4/1979 | United Kingdom . |
| 2013563 | 8/1979 | United Kingdom . |
| 2053779 | 2/1981 | United Kingdom . |

OTHER PUBLICATIONS

News Bulletin of the Exterior Insulation Manufacturers Association, Spring, 1982; Fall, 1982, and Winter, 1983. "Focus on Insulation", Buildings, pp. 72-74, (Feb., 1983).

(List continued on next page.)

Primary Examiner—Carl D. Friedman
Assistant Examiner—Kevin D. Wilkens
Attorney, Agent, or Firm—Synnestvedt & Lechner

[57] ABSTRACT

Finishing systems and roof decks are provided which include a gypsum board having a set gypsum core faced with a fibrous mat. The gypsum core includes one or more additives which are effective in simultaneously improving the water and fire resistance of the board. In preferred embodiments, the board has sufficient water-resistant additive for absorbing less than about 10% water in an ASTM C-473 test.

5 Claims, 4 Drawing Sheets

U.S. PATENT DOCUMENTS

| | | |
|---|---|---|
| 3,941,632 | 3/1976 | Swedenberg et al. . |
| 3,944,698 | 3/1976 | Dierks et al. . |
| 3,947,398 | 3/1976 | Williams . |
| 3,993,822 | 11/1976 | Knauf et al. . |
| 4,020,237 | 4/1977 | von Hazmburg . |
| 4,065,597 | 12/1977 | Gillespie . |
| 4,073,997 | 2/1978 | Richards et al. . |
| 4,128,699 | 12/1978 | Kole et al. . |
| 4,148,781 | 4/1979 | Narukawa et al. . |
| 4,181,767 | 1/1980 | Steinau . |
| 4,187,130 | 2/1980 | Kautz . |
| 4,195,110 | 3/1980 | Dierks et al. . |
| 4,203,788 | 5/1980 | Clear . |
| 4,242,406 | 12/1980 | El Bouhnini . |
| 4,265,979 | 5/1981 | Baehr et al. . |
| 4,296,169 | 10/1981 | Shannon . |
| 4,303,722 | 12/1981 | Pilgrim . |
| 4,335,177 | 6/1982 | Takeuchi . |
| 4,344,804 | 8/1982 | Bijen et al. . |
| 4,344,910 | 8/1982 | Bijen . |
| 4,351,867 | 9/1982 | Mulvey et al. . |
| 4,361,616 | 11/1982 | Bomers . |
| 4,378,405 | 3/1983 | Pilgrim . |
| 4,403,006 | 9/1983 | Bruce et al. . |
| 4,477,300 | 10/1984 | Pilgrim . |
| 4,504,533 | 3/1985 | Altenhofer et al. . |

OTHER PUBLICATIONS

*Modern Plastics*, "Opportunity Knocks—and Loudly—For Extruded PS Foam Board", Dec., 1978, pp. 46–47.

"Fire Resistant Gypsum Sheathing", (undated), Brochure No. GA-252-84 of the Gypsum Association.

"Glasfaservliese" (Glass Fibre Mats) by J. Hansmann.

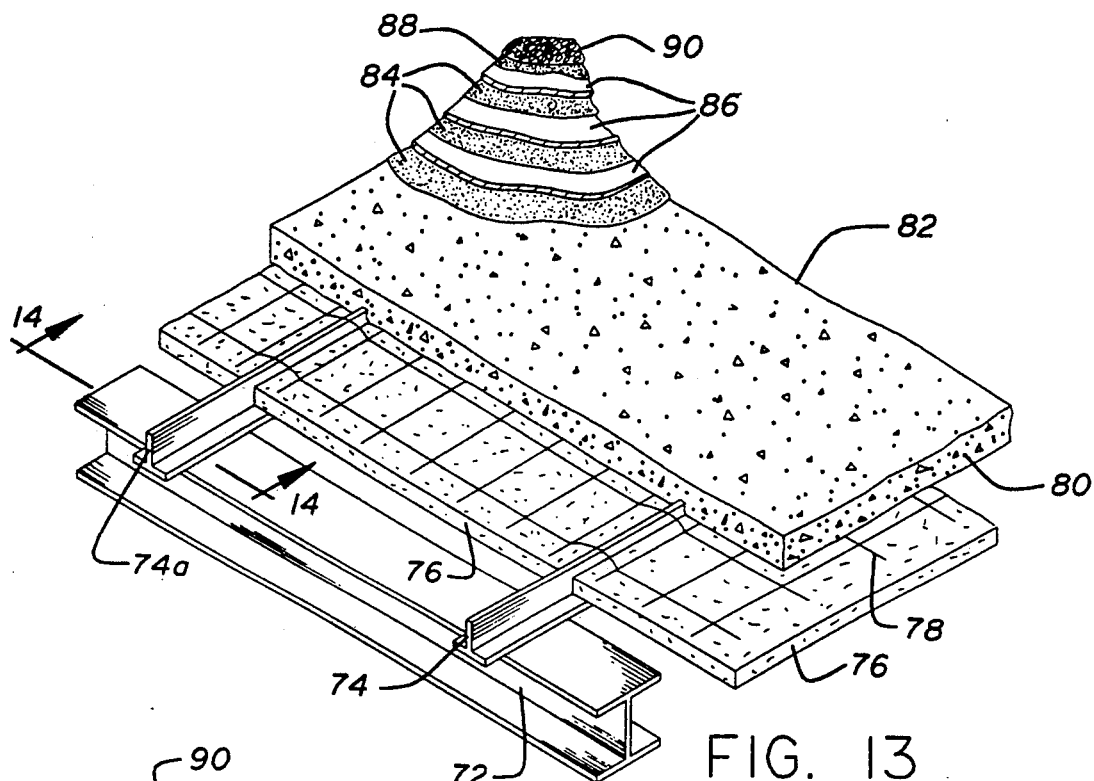
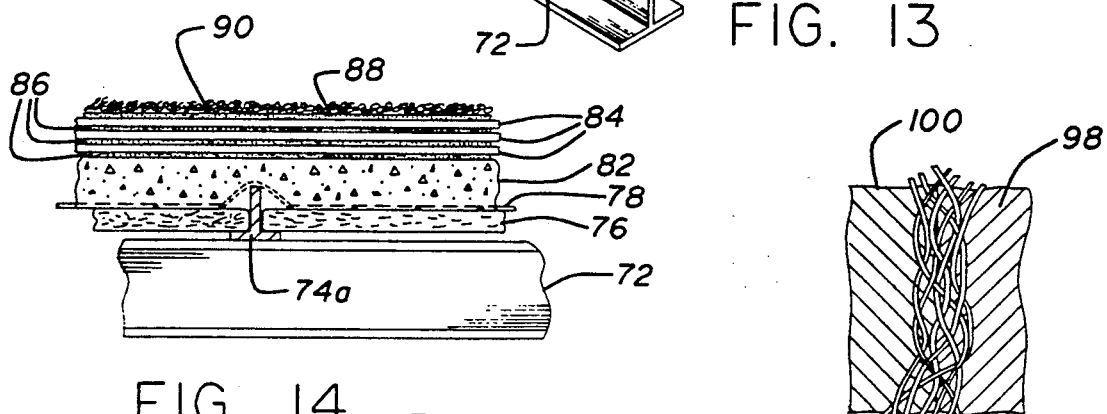
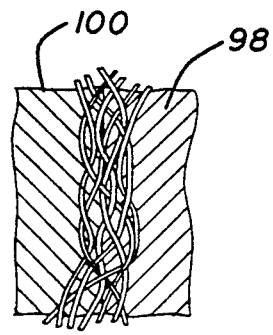
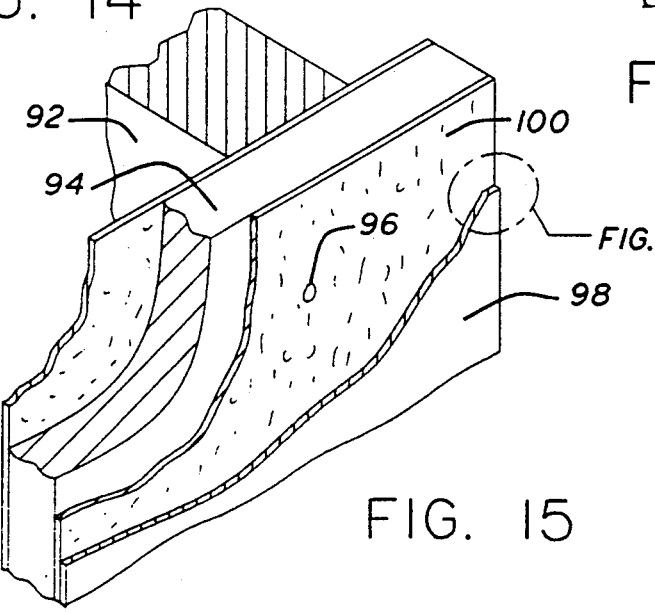
FIG. 13
FIG. 14
FIG. 15
FIG. 16

FINISHING AND ROOF DECK SYSTEMS CONTAINING FIBROUS MAT-FACED GYPSUM BOARDS

CROSS REFERENCE TO RELATED APPLICATION

This application is a divisional application of copending U.S. Ser. No. 07/725,946, filed on Jun. 27, 1991, now U.S. Pat. No. 5,220,762, which in turn is a file wrapper continuation application of U.S. Ser. No. 07/481,710, filed on Feb. 15, 1990, now abandoned, which in turn is a file wrapper continuation application of U.S. Ser. No. 07/262,229, filed on Oct. 21, 1988, now abandoned, which in turn is a file wrapper continuation application of U.S. Ser. No. 06/769,582, filed on Aug. 26, 1985, now abandoned, which in turn is a continuation-in-part application of U.S. Ser. No. 06/583,874, filed on Feb. 27, 1984, now U.S. Pat. No. 4,647,496, issued on Mar. 3, 1987.

FIELD OF THE INVENTION

The invention described in aforementioned application Ser. No. 06/583,874 relates to improvements in exterior finishing systems such as, for example, exterior insulation systems for buildings, and also to improvements in shaft wall assemblies for buildings. More particularly, the aforementioned invention relates to an improved structural component for use as a support surface in an exterior finishing system, including an exterior insulation system (sometimes referred to herein for convenience as "EISystem"), and also to the use of said component in hollow shaft wall assemblies, for example, those used in constructing elevator shafts and stairwells.

The EISystem and shaft wall assemblies described in said '874 application include as a structural component thereof a fibrous mat-faced gypsum board. The claims of said '874 application are directed to said improved EISystem, to improved fibrous mat-faced gypsum board which can be used in said system, and to the preparation of said improved board.

Although the present application includes a description of said EISystem and of said improved board, the description and claims hereof are directed to improved exterior and interior finishing systems which include a fibrous mat-faced gypsum board as a structural component thereof. The present invention will be described initially in connection with its use in roof deck systems and in plaster lath systems, but as will be explained hereinafter, its use has wider applicability.

Installation of an exemplary and popularly used roof deck system in construction of a building, including newly constructed buildings, generally involves the following sequential steps: (A) constructing a frame for support of the roof of a building; (B) affixing to the frame corrugated sheets to provide a surface for support of the other components of the roof deck system; (C) affixing to the corrugated sheets planar support members; and (D) affixing to the planar support members an exterior finishing material having good weathering properties. Roof deck systems which include panels of insulation sandwiched between the aforementioned corrugated sheets and planar support members are used widely also. Such systems are designed to be insulative in character and weather resistant. Such roof deck systems can be used to advantage to conserve energy used for heating and to conserve energy used for air-conditioning.

More specifically, such roof deck systems typically include corrugated metal sheets which are mechanically affixed, usually by screws or bolts, to appropriate structural members of the building such as steel beams. The corrugated metal sheets support the weight of the components which overlie it, including the insulating material (when used), the planar support members, and the finishing material. Light weight, low density insulating panels of expanded polystyrene, are used widely in such systems, especially in colder climates. The planar support members generally comprise gypsum board and are fastened in place by mechanical fasteners such as screws to the underlying corrugated metal sheet. When panels of insulation are used, they are sandwiched between the underlying corrugated metal sheets and the overlying panels of gypsum board. An exterior finishing material, such as a rubber membrane or alternating layers of asphalt and roofing felt, overlies the panels of gypsum board.

Another exemplary roof deck system that is in wide use is one that is known as the "poured-in-place" gypsum deck. Construction of such decks usually involves the following sequential steps: (A) constructing a frame for support of the roof of a building; (B) applying to the frame planar support members to provide a surface for support of the other components of the system; (C) placing a reinforcing mesh-like material on the support members; (D) pouring over the mesh-like material a cementitious slurry which hardens to form a smooth continuous deck surface for the support of the other components of the system; and (E) affixing to the hardened cementitious deck an exterior finishing material having weather-resistant properties.

More specifically, such "poured-in-place" gypsum decks generally comprise elongate, horizontally disposed supporting metal I-beams (called "purlins") which are attached to appropriate structural members of the building. Elongate, horizontally disposed sub-purlins or "bulb Tees", so-called because of their resemblance to an inverted "T" when viewed in cross section, are positioned transversely across the tops of the underlying purlins, and are usually welded into place. The planar support members, which typically comprise panels of gypsum board, are laid between the sub-purlins and are supported there by flanges formed by the bottom of the inverted "T". (Such gypsum board panels are referred to in the industry as "form boards".) Open metal mesh reinforcing screen is laid over the gypsum form boards and sub-purlins. A gypsum slurry is then poured over the screen, sub-purlins and gypsum form boards to a predetermined depth. Once the gypsum slurry has set and dried, a roofing membrane such as the aforementioned alternating layers of asphalt and roofing felt is adhered to the top of the deck.

It is noted also that the face of the form board facing the interior of the building, that is, the ceiling thereof, may be finished with interior finishing systems, usually by "field painting" with a suitable form board paint. The paint is typically applied under pressure with a sprayer.

An example of a poured-in-place roof deck is described in U.S. Pat. No. 3,289,371. This patent refers to the tendency of such decks to crack. This weakens the deck and stresses the roofing membrane, thereby inducing roof failure and leaking. To combat these problems, the need for a suitable support member and proper reinforcement is stressed.

It is mandatory that roof deck systems, including the types described above, possess certain characteristics for commercial acceptability. For example, it is particularly important that the planar support members, for example, panels of gypsum board, used in such systems possess fire-resistant qualities that enable the systems utilizing them to meet the strict fire regulations of municipal codes. In addition, it is also important that the support members possess water-resistant qualities which enable the board to resist the significant weathering which such systems are subjected to during both installation and use. Such weathering includes, for example, attack by precipitation and wind uplifting, each of which contributes to the degradation of the overlying finishing materials and the underlying planar support members.

As regards interior finishing systems for use in a building, installation of such a system generally involves the following sequential steps: (A) constructing a frame for support of the interior walls of a building; and (B) affixing to the frame planar support members which provide a smooth continuous surface to support an interior finishing material having aesthetic and durability properties. Such systems are designed to be strong and durable and to withstand abuse during the building's occupancy.

More specifically, an exemplary interior finishing system includes: (A) wood or metal frame members which are mechanically affixed to appropriate structural members of the building; (B) planar support members comprising panels of gypsum lath; and (C) "thin coat" or "veneer" plaster covering the gypsum lath. The gypsum lath panels are mechanically affixed by nails or screws to the frame members.

The effective application of the plaster coating to the gypsum lath is tricky business. Problems often arise because the thin plaster coating contains a relatively large quantity of water when applied. Until a significant portion of this water is removed from the plaster, it cannot be properly smoothed by troweling. Where the removal of water from the plaster is primarily by air drying, it has been found that by the time the plaster is in a trowelable condition, it is also close to setting, leaving insufficient time to do the troweling job properly. For this reason, it was once the practice to apply a relatively rough plaster base coat followed by a relatively thin plaster finish coating. This practice is somewhat self-defeating since the material and labor savings intended to be gained with the thin coat plaster are not realized when more than one plaster coat is applied.

If, on the other hand, the water in the plaster coating is withdrawn too quickly, as by use of highly water absorbent gypsum lath, the plaster coating dries out before it has time to set, this leading to cracking and spalling of the set plaster coating. Thus, a balance must be struck such that the rate of water absorption from the thin plaster coating applied to the planar support surface is sufficiently slow to avoid drying prior to setting, yet sufficiently rapid to remove a sufficient quantity of water to permit the plaster to be properly troweled.

The present invention relates to improved exterior finishing systems and to improved interior finishing systems, including, for example, roof deck systems and plaster lath systems, which include an improved planar support member as a structural component thereof.

REPORTED DEVELOPMENTS

As mentioned above, widely used roof deck systems include gypsum board as the planar support member thereof. Such gypsum board is paper-faced and includes a set gypsum core which ordinarily includes therein fire-resistant and water-resistant additives, for example, chopped glass fibers and wax-asphalt emulsion, respectively. The surface of the paper facings of the board are typically treated with a water repellant agent, such as, for example, a poly(ethylene) emulsion. The use of such water-resistant additives and water repellant paper is designed to provide a product that resists attacks by precipitation which is particularly damaging during the construction phase of the roof deck system. Nevertheless, it has been found that such paper-faced, water-resistant gypsum board is usually damaged by exposure to precipitation. The paper facing tends to come loose and degrade, and the gypsum core tends to deteriorate. Damaged paper facing and a deteriorated core comprise a poor substrate upon which to adhere an overlying material such as a roof membrane.

With respect to gypsum lath used commercially in the aforementioned interior finishing systems, it comprises also a set gypsum core faced with paper. An example of such paper-faced gypsum lath is described in U.S. Pat. No. 3,382,636, assigned to the assignee of the present application. The gypsum lath comprises a gypsum core having a thickness, for example, of about $\frac{1}{4}"$, sandwiched between sheets of paper which may be coated on the side contiguous the core with an adhesive in order to secure the product together. On the plaster-receiving side of the lath, there are provided small apertures or pinholes which extend through the paper and through the adhesive coating (if used). The pinholes of the paper, which is treated with a wetting agent, provide passageways for excess water from the thin plaster coating applied thereover to pass into the relatively absorbent gypsum core. This permits the plaster coating to reach a trowelable consistency before setting, leaving sufficient time for a worker to do the troweling job properly.

The gypsum core of the above-described gypsum lath may include chopped glass fibers as a reinforcing and fire-resistant additive. In addition, such lath may be insulated with, for example, aluminum foil laminated on one side of the lath. Examples of such lath and thin coat plasters for use therewith are described in Georgia-Pacific publication No. 6695 entitled "Plaster Products/Dens-Cote Veneer Lath and Plaster".

It would be of benefit to have a gypsum lath (also referred to in the industry as "veneer lath") which enables the applicator to more readily apply the plaster coating and in a manner such that a good finished product is obtained consistently.

In accordance with the present invention, there are provided an improved exterior finishing system and an improved interior finishing system, each of which include a gypsum based structural component, including for example, improved roof decks and interior systems which include thin plaster coatings adhered to veneer or gypsum lath.

SUMMARY OF THE INVENTION

In accordance with the invention described and claimed in aforementioned application Ser. No. 583,874, there is provided an improved structural support element comprising a fibrous mat-faced gypsum support surface for use in an exterior finishing system, including exterior insulating systems, for buildings. A preferred form of the fibrous mat-faced gypsum support surface or member described and claimed in said '874 application comprises a gypsum core having one or more additives therein which improve the water resistance of the core.

In accordance with the present invention, there is provided an exterior finishing system or an interior finishing system for use in a building comprising, as a support member thereof, a fibrous mat-faced gypsum board comprising a gypsum core having one or more additives therein which improve the water resistance of the core, and an exterior or interior finishing material overlying said board.

In preferred form, the mat for use in said invention is a glass fiber mat in which filaments of glass fiber are bonded together by an adhesive.

For use in applications in which fire-resistant properties are deemed to be important, said gypsum core includes also one or more additives which impart improved fire-resistant properties to the board.

A particular embodiment of the present invention comprises a roof deck system for use in a building which includes supporting means, preferably corrugated sheet(s), fibrous mat-faced, water resistant gypsum board overlying said means, and an exterior finishing material overlying said board. In a modified form of this embodiment, insulating material is sandwiched between said supporting means and said gypsum board.

Another embodiment of the present invention comprises a roof deck system comprising a fibrous mat-faced, water-resistant gypsum board, a cementitious composition overlying said gypsum board, and an exterior finishing material overlying the cementitious composition. In preferred form, a mesh-like material is sandwiched between said gypsum board and said cementitious composition.

A particular embodiment of the present invention comprising an interior finishing system comprises a plaster lath system which includes a fibrous mat-faced, water-resistant gypsum board and an interior finishing material overlying said gypsum board. In preferred form, said finishing material comprises a mono-ply of thin plaster coating.

An additional preferred form of the invention described and claimed in the '874 application comprises a gypsum board having each of its core faces covered with a porous glass fiber mat, with the mat of one of the faces being adhered to the core by set gypsum penetrating but part-way into the thickness of the mat and having its outer surface substantially free of set gypsum. As will be described below, the glass fiber mat surface, which is free of set gypsum, provides an excellent substrate to which there can be adhered panels of insulation, or exterior finishing materials such as asphalt, or interior finishing materials such as plaster.

There are numerous advantages which flow from the use of the aforementioned invention in both exterior and interior finishing systems which include fibrous mat-faced, water-resistant gypsum board. Such fibrous mat-faced support surfaces that have exterior or interior finishing materials applied thereover can have higher tensile or cohesive strength than a like system that includes paper-faced gypsum board. The fibrous mat-faced surface of the gypsum support element is "nailable", and accordingly, it can be secured readily to an underlying frame or other substrate by nailing. In comparison to various of the commercially available systems, the improved support surface of said invention has improved strength uniformity in both the length and width dimensions of the system. Unlike conventional paper cover sheets, the fibrous mat does not expand or contract during the manufacture of the product; this reduces cockle and leads to uniformity of dimensions. The water-resistant board provides a substantially improved weather-resistant product which better resists degradation both within and outside of the system. The use of fire-resistant additive(s) in the core of the board provides a structural element that can be used to excellent advantage in the numerous and varied applications in which conventional paper-faced gypsum lath is used. Such applications include, for example, the use of the board as structural components of walls, ceilings, partitions, and the like.

BRIEF DESCRIPTION OF THE DRAWINGS

FIG. 13 is a perspective view of another type of roof system incorporating the panel in accordance with the invention as the primary support layer;

FIG. 14 is a sectional view taken along line 14—14 of FIG. 13;

FIG. 15 is a perspective view partly broken away and in section of a composite wall structure employing the panel in accordance with the invention; and FIG. 16 is a greatly enlarged view of the circled portion of FIG. 15 showing the penetration of the plaster layer into the fibrous surface of the panel.

DETAILED DESCRIPTION OF THE INVENTION

Figure 1:
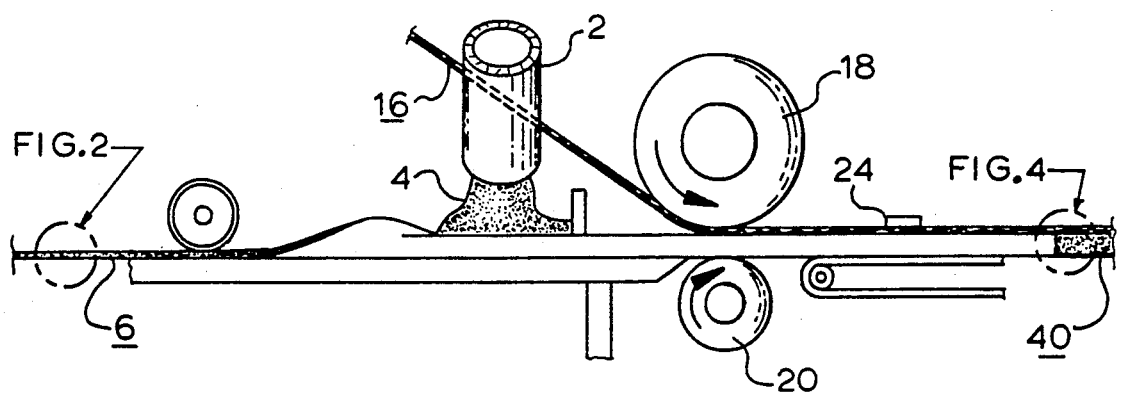
FIG. 1 is a somewhat diagrammatic, fragmentary side elevational view illustrating portions of a manufacturing line for producing gypsum board of a type suitable for use in the manufacture of gypsum board prepared for use in accordance with the present invention.

The essential components of the finishing system of the present invention comprise fibrous mat-faced, water-resistant gypsum board and an overlying finishing material. The finishing material can be in multi-ply or mono-ply form. It can be positioned contiguously to said gypsum board or it can directly overlie or be directly affixed to a member(s) which is sandwiched between said gypsum board and said finishing material.

Turning first to a description of the fibrous mat-faced, water-resistant gypsum board for use in the present invention, it comprises a set gypsum core faced with a fibrous mat. The gypsum core is basically of the type used in those gypsum structural products which are known as gypsum wallboard, dry wall, gypsum board, gypsum lath and gypsum sheathing. The core of such a product is formed by mixing water with powdered anhydrous calcium sulfate or calcium sulfate hemihydrate (CaSO$_4$.½H$_2$O), also known as calcined gypsum; and thereafter allowing the mixture to hydrate or set into calcium sulfate dihydrate (CaSO$_4$.2H$_2$O), a relatively hard material. The core of the product will in general comprise at least about 85 wt. percent of set gypsum.

The composition from which the set gypsum core is made can include optional constituents, including, for example, those included conventionally in gypsum sheathing. Examples of such constituents include set accelerators, retarders, foaming agents, and dispersing agents. As will be described in more detail below, a preferred gypsum core for use in exterior and interior finishing systems includes one or more additives which improve the water resistant properties of the core.

The surface of the core of the gypsum board is faced with a fibrous mat. The fibrous mat should be sufficiently porous to permit water in the aqueous gypsum slurry from which the gypsum core is made to evaporate therethrough. As described in detail below, the fibrous mat-faced gypsum board can be made efficiently by forming an aqueous gypsum slurry which contains excess water and placing thereon the fibrous mat. Aided by heating, excess water evaporates through the porous mat after the calcined gypsum sets.

The fibrous mat comprises material which is capable of forming a strong bond with the set gypsum comprising the core of the gypsum board. Examples of such materials include a mineral-type material such as glass fibers and synthetic resin fibers. The mat can comprise continuous or discrete strands or fibers and be woven or nonwoven in form. Nonwoven mats such as chopped strand mat and continuous strand mat can be used satisfactorily and are less costly than woven materials. The strands of such mats are bonded together by suitable adhesive. The mat can range in thickness, for example, from about 15 to about 40 mils, with a thickness of about 25 to about 35 mils being preferred. The aforementioned fibrous mats are known and are commercially available in many forms.

The preferred fibrous mat is a fiber glass mat comprising fiber glass filaments oriented in random pattern and bound together with a resin binder. Fiber glass mats of this type are commercially available, for example, those sold under the trademark DURA-GLASS by Manville Building Materials Corporation and those sold by Elk Corporation as BUR mat or shingle mat.

Although improvements can be realized by the use of a gypsum core which has but one of its surfaces faced with fibrous mat as described herein, it is preferred that both surfaces of the core be faced with substantially the same fibrous material. If the surfaces of the core are faced with materials that have different coefficients of expansion, the core tends to warp. Fibrous mat-faced gypsum board and methods for making the same are known, for example, as described in Canadian Patent No. 993,779 and U.S. Pat. No. 3,993,822.

The fibrous mat-faced gypsum board for use in the present invention comprises a gypsum core which has water-resistant properties. The preferred means for imparting water-resistant properties to the gypsum core is to include in the gypsum composition from which the core is made one or more additives which improve the ability of the set gypsum composition to resist being degraded by water, for example, to resist dissolution. In preferred form, the water resistance of the core is such that it absorbs less than about 10%, preferably less than about 7.5% and most preferably less than about 5% water when tested in accordance with ASTM method C-473.

Fibrous mat-faced gypsum board having a gypsum core which does not have a water-resistant additive(s) therein has substantially better water-resistant properties than conventional paper-faced gypsum wallboard or sheathing. Nevertheless, evaluations have shown that the bond between the fibrous mat and gypsum core can deteriorate relatively quickly under the influence of water. For example, samples exposed to the weather showed loosening at the glass fiber facing within one to two months. In contrast, evaluations of water-resistant gypsum core faced with fibrous mat, as described herein, have shown the bond between the mat and core resists being degraded by water for indefinite periods of time.

Examples of materials which have been reported as being effective for improving the water-resistant properties of gypsum products are the following: poly(vinyl alcohol), with or without a minor amount of poly(vinyl acetate); metallic resinates; wax or asphalt or mixtures thereof; a mixture of wax and/or asphalt and also cornflower and potassium permanganate; water insoluble thermoplastic organic materials such as petroleum and natural asphalt, coal tar, and thermoplastic synthetic resins such as poly(vinyl acetate), poly(vinyl chloride) and a copolymer of vinyl acetate and vinyl chloride and acrylic resins; a mixture of metal rosin soap, a water soluble alkaline earth metal salt, and residual fuel oil; a mixture of petroleum wax in the form of an emulsion and either residual fuel oil, pine tar or coal tar; a mixture comprising residual fuel oil and rosin; aromatic isocyanates and diisocyanates; organohydrogenpolysiloxanes; a wax-asphalt emulsion with or without such materials as potassium sulfate, alkali and alkaline earth aluminates, and Portland cement; a wax-asphalt emulsion prepared by adding to a blend of molten wax and asphalt an oil-soluble, water-dispersing emulsifying agent, and admixing the aforementioned with a solution of casein which contains, as a dispersing agent, an alkali sulfonate of a polyarylmethylene condensation product.

A preferred material for use in improving the water-resistant properties of the gypsum core comprises wax-asphalt emulsion, species of which are available commercially. The wax portion of the emulsion is preferably a paraffin or microcrystalline wax, but other waxes can be used also. The asphalt in general should have a softening point of about 115° F., as determined by the ring and ball method. The total amount of wax and asphalt in the aqueous emulsion will generally comprise about 50 to 60 wt. percent of the aqueous emulsion, with the weight ratio of asphalt to wax varying from about 1 to 1 to about 10 to 1. Various methods are known for preparing the wax-asphalt emulsion, as reported in U.S. Pat. No. 3,935,021 to D. R. Greve and E. D. O'Neill, assigned to the same assignee as the present invention. Commercially available wax asphalt emulsions that can be used in the composition described herein are sold by United States Gypsum Co. (WAX EMULSION brand wax emulsion), Monsey Products, (NO. 52 EMULSION brand wax asphalt emulsion) and Douglas Oil Co. (DOCAL NO. 1034 brand wax asphalt emulsion). The amount of wax-asphalt emulsion used can be within the range of about 3 to about 10 wt. percent, preferably about 5 to about 7 wt. percent, based on the total weight of the ingredients of the composition from which the set gypsum core is made, said ingredients including the water of the wax-asphalt emulsion, but not including additional amounts of water that are added to the gypsum composition for forming an aqueous slurry thereof.

A particularly preferred material for use in improving the water-resistant properties of the gypsum core comprises a mixture of materials, namely, poly(vinyl alcohol) and wax-asphalt emulsion of the aforementioned type. The use of such additives to improve the water resistance of gypsum products is described in aforementioned U.S. Pat. No. 3,935,021.

The source of the poly(vinyl alcohol) is preferably a substantially completely hydrolyzed form of poly(vinyl acetate), that is, about 97 to 100% hydrolyzed polyvinyl acetate. The poly(vinyl alcohol) should be cold-water insoluble and soluble in water at elevated temperatures, for example, at temperatures of about 140° to about 205° F. In general, a 4 wt. percent water solution of poly(vinyl alcohol) at 20° C. will have a viscosity of about 25 to 70 cp as determined by means of the Hoeppler falling ball method. Commercially available poly(vinyl alcohols) for use in the composition of the present invention are available from E. I. du Pont de Nemours and Company, sold under the trademark "ELVANOL" and from Monsanto Co., sold under the trademark "GELVATOL". Examples of such products are ELVANOL, Grades 71-30, 72-60, and 70-05, and GELVATOL, Grades 1-90, 3-91, 1-60, and 3-60. Air Products Corp. also sells the product as WS-42.

The amounts of poly(vinyl alcohol) and wax-asphalt emulsion used should be at least about 0.05 wt. percent and about 2 wt. percent respectively. The preferred amounts of poly(vinyl alcohol) and wax-asphalt emulsion are about 0.15 to about 0.4 wt. percent and about 3.0 to about 5.0 wt. percent respectively. Unless stated otherwise, the term "wt. %" when used herein and in the claims means weight percent based on the total weight of the ingredients of the composition from which the set gypsum core is made, said ingredients including the water of the wax-asphalt emulsion, but not including additional amounts of water that are added to the gypsum composition for forming an aqueous slurry thereof.

In applications of the type where fire-resistant properties are considered important, the core of the fibrous mat-faced gypsum board includes preferably one or more additives which improve the ability of the set gypsum composition to maintain its integrity when subjected to the heat of fire. Examples of materials which have been reported as being effective for improving the fire-resistant properties of gypsum products include mineral fibers such as, for example, glass fibers, asbestos fibers, and calcium sulfate whisker fibers. A mixture of one or more of such fibers can be used. Other exemplary materials which are known for use in conventional fire resistant gypsum board are unexpanded vermiculite, clay, colloidal silica and colloidal alumina. Typically, mineral fibers, and particularly glass fibers, are used in admixture with one or more of the aforementioned exemplary materials. For example, see U.S. Pat. No. 3,616,173, assigned to the same assignee as the present invention.

A preferred material for use in improving the fire resistant properties of the fibrous mat-faced gypsum board comprises chopped glass fibers, for example, as described in aforementioned U.S. Pat. No. 3,616,173, the disclosure of which, as it relates to glass fibers, is incorporated herein by reference. Briefly described, said glass fibers are of the drawn textile glass fiber type, produced as continuous individual filaments and having a diameter of from about 0.0002 to about 0.001". The individual filaments are usually grouped into strands, the filaments having coated thereon a relatively weak, bonding type material, such as, for example, starch or other water softenable or soluble coating material. The bonding material helps to prevent abrading between the several grouped filaments of each strand. Prior to the addition of the loosely bonded textile glass fibers to the core composition, the strands are cut into short lengths such as, for example, ⅛" to 1". Once added to the aqueous slurry composition from which the core is made, the bonding or coating material dissolves, and the strands separate into individual fibers which become uniformly distributed throughout the slurry as the slurry is mixed.

The presence of mineral fibers in the core of fibrous mat-faced gypsum board results in a product which has unusually high fire-resistant characteristics. For example, the presence of a predetermined amount of chopped glass fibers in the core of glass mat-faced gypsum board of predetermined thickness provides a product which has fire resistant characteristics that are significantly better than those of conventional paper-faced gypsum board that has a like amount of glass fibers in its core and a like thickness. The effects which flow from this development are significantly important and can desirably be taken advantage in several different ways. For example, the development can be used to produce a glass mat-faced gypsum board which has a lower density than that of conventional paper-faced, glass fiber-containing gypsum board without sacrificing fire resistant properties. Similarly, significantly lower amounts of glass fibers can be used in the glass mat-faced board without sacrificing fire-resistant properties.

The amount of glass fibers included in the core should be at least about 0.03 wt. % and can vary over a wide range, for example, from about 0.03 to about 0.3 wt. percent based on the total weight of the dry ingredients comprising the core, that is, the total weight of the ingredients before they are combined with water to make the aqueous slurry from which the core is formed. In preferred form, the amount of glass fibers comprises about 0.07 to about 0.2 wt. percent.

The core of the fibrous mat-faced board for use in fire-resistant applications can be fabricated according to available techniques into a density of desired value. Preferably, the density of the core should not exceed about 55 lbs/cu. ft. It is believed that a density within the range of about 45 to about 55 lbs/cu. ft. will be used most widely.

An attractive feature of the present invention is that the fibrous mat-faced gypsum board can be made utilizing existing wallboard manufacturing lines, for example, as shown somewhat diagramatically in FIG. 1. In conventional fashion, dry ingredients (not shown) from which the gypsum core is formed are pre-mixed and then fed to a mixer of the type commonly referred to as a pin mixer 2. Water and other liquid constituents (not shown) used in making the core are metered into the pin mixer 2 where they are combined with the dry ingredients to form an aqueous gypsum slurry. Foam is generally added to the slurry in the pin mixer to control the density of the resulting core. The slurry 4 is dispersed through one or more outlets at the bottom of the mixer 2 onto a moving sheet of fibrous mat 6. The sheet of fibrous mat 6 is indefinite in length and is fed from a roll (not shown) of the mat.

Figure 7:
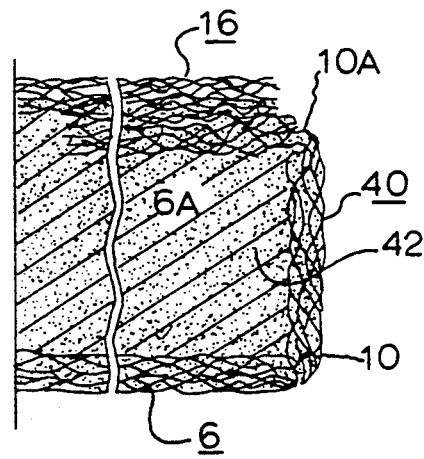
FIG. 7 is a transverse sectional view of an edge portion of the completed board, this view being taken as indicated by the line 7—7 on FIG. 4.

As is common practice in the manufacture of conventional paper-faced gypsum board, the two opposite edge portions of the fibrous mat 6 are progressively flexed upwardly from the mean plane of the mat 6 and then turned inwardly at the margins so as to provide coverings for the edges of the resulting board 40. In FIG. 1, this progressive flexing and shaping of the edges of the mat 6 are shown for only one side edge of the mat and the conventional guiding devices which are ordinarily employed for this purpose are omitted from the figure for the sake of clarity. FIG. 7 shows an edge of the set gypsum core 42 covered by the overlapped edge portion 6A of the mat 6. FIG. 7 shows also score marks 10 and 10A of the mat 6, the score marks permitting the formation of good edges and flat surfaces. The score marks 10 and 10A are made by a conventional scoring wheel 12. An advantage of using the preferred form of glass fiber mat is that it is capable of being scored and edged like conventional paper facing.

Another sheet of fibrous mat 16 is fed from a roll (not shown) onto the top of slurry 4, thereby sandwiching the slurry between the two moving fibrous mats which form the slurry. The mats 6 and 16 with the slurry 4 sandwiched therebetween enter the nip between the upper and lower forming or shaping rolls 18 and 20, and are thereafter received on a conveyer belt 22. Conventional edge guiding devices, such as indicated at 24 shape and maintain the edges of the composite until the gypsum has set sufficiently to retain its shape. In due course, sequential lengths of the board are cut and further processed by exposure to heat which accelerates the drying of the board by increasing the rate of evaporation of excess water in the gypsum slurry.

With reference to FIG. 7, it has been observed that the set gypsum of the core 42 is effective in forming satisfactory bonds with the mats and between the edge portions of the overlying mat 16 and the overlapped edge portion 6A of the underlying mat 6, thus making it unnecessary to use a bond improver in the slurry or an edge paste to form the aforementioned bonds.

Figure 2:
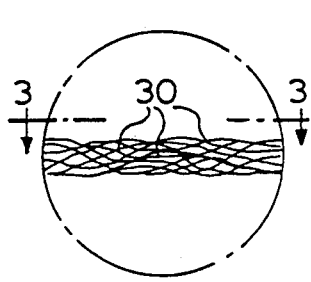
FIG. 2 is an enlarged fragmentary sectional view, taken as indicated toward the left of FIG. 1, of an underlying fiber glass mat used in the manufacture of the gypsum board.
Figure 3:
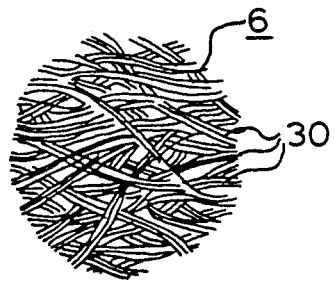
FIG. 3 is a fragmentary plan view taken as indicated by the line 3—3 on FIG. 2.

The preferred form of mats 6 and 16, as shown in FIGS. 2 and 3, comprises glass fiber filaments 30 oriented in random pattern and bound together with a resin binder (not shown).

Figure 4:
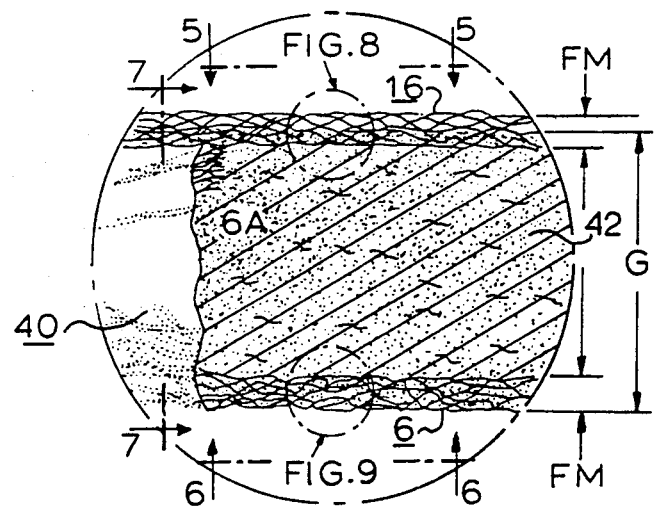
FIG. 4 is an enlarged sectional view taken as indicated toward the right on FIG. 1 and illustrating both underlying and overlying fiber glass mats, with intervening gypsum composition, used in the manufacture of the board.
Figure 5:
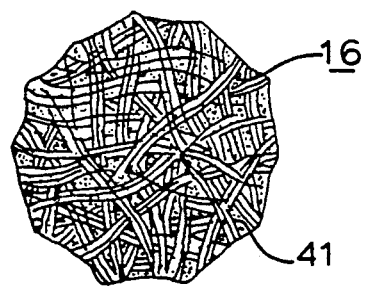
FIG. 5 is a fragmentary plan view taken as indicated by line 5—5 on FIG. 4.
Figure 6:
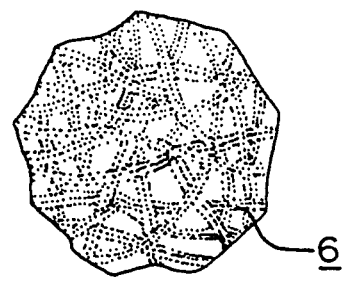
FIG. 6 is a fragmentary bottom view taken as indicated by the line 6—6 on FIG. 4 and illustrating the bottom surface of the underlying mat of the board.
Figure 8:
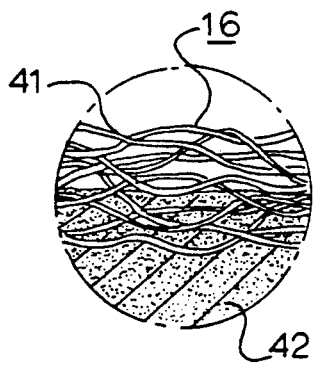
FIG. 8 is a further enlarged fragmentary sectional view taken as indicated toward the top of FIG. 4.
Figure 9:
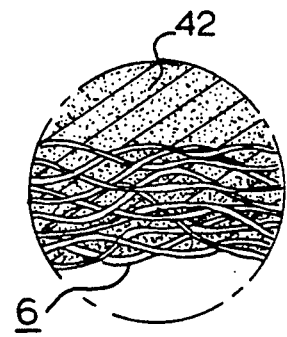
FIG. 9 is a further enlarged fragmentary sectional view taken as indicated toward the bottom of FIG. 4.

A preferred form of glass fiber mat-faced gypsum board 40 is shown in FIGS. 4 and 7. It comprises one in which the set gypsum of the core 42 penetrates substantially through the thickness of the mat 6 over substantial area portions thereof and in which the set gypsum of the core 42 penetrates the mat 16 partially, with the surface being thus substantially free of set gypsum. The gypsum-free surface of mat 16, as seen in FIG. 8, is highly textured, and provides an excellent substrate for adhering thereto an overlying component inasmuch as it comprises many interstices into which an adhesive composition can flow and bond.

The phrase "substantially penetrated by set gypsum", as used herein, means that the set gypsum of the core, extends from the mat surface which is contiguous to the core to the outer mat surface and coats glass fibers on the outer surface with a thin film of set gypsum to the extent that the outline of glass fibers can be seen through the thin film of set gypsum. The phrase "over substantial area portions of the outer surface", as used herein, means that about 30 to 75% of the outer surface area of the mat is substantially penetrated by set gypsum. Preferably, about 45 to about 55% of the outer surface area of the mat is substantially penetrated by set gypsum. Accordingly, the gypsum-coated surface of this preferred embodiment of the board comprises a surface that has a roughened or patterned appearance; it does not comprise a smooth continuous coating of set gypsum. This preferred form of board can be formed with relatively small amounts of gypsum slurry being deposited on the underlying support surface, thus minimizing the need to clean the surface of the board-forming equipment.

The need for such cleaning can be substantially avoided by adjusting the viscosity of the slurry so that it penetrates but part-way through the underlying fibrous mat, for example, up to about 50% of its thickness. Thus, this preferred form of board has two gypsum-free fiber-faced surfaces.

The manufacture of the aformentioned preferred forms of board can be accomplished by controlling the viscosity of the aqueous slurry of the calcined gypsum in a manner such that the slurry penetrates the underlying and overlying mats to the desired degree. In manufacturing each of the aforementioned preferred forms of board, the viscosity of the slurry should be such that it penetrates about 10 to 50% of the thickness of the overlying mat over the entire surface area thereof.

The recommended means for controlling the viscosity of the slurry is to add thereto a viscosity-control agent. Such viscosity-control agents are known in the field of gypsum board manufacture. A preferred viscosity-control agent is paper fiber. Examples of other agents that can be used are cellulosic thickeners, bentonite clays, starches, and gypsum whisker fibers.

The particular viscosity values that are used in the manufacturing operation can vary from one application to the next, depending on the porosity of the mat, and the desired penetration of the slurry. Accordingly, for any particular application, the viscosity value is best determined empirically.

In using the preferred form of glass fiber mat, as described above, to manufacture the aforementioned preferred forms of board, developmental work has shown that satisfactory results can be achieved utilizing a gypsum slurry having a viscosity within the range of about 5000 to 7000 cp. As used herein, the viscosity value refers to Brookfield viscosity measured at a temperature of 70° F. at 10 rpm utilizing paddle No. 3. It should be appreciated that the amount of viscosity-control agent added to the slurry to give the desired viscosity will vary depending on the particular agent used and the specific viscosity desired.

In preferred form, the core of fibrous mat-faced gypsum board that does not include fire-resistant additive(s) has a density of about 40 to about 50 lbs/cu. ft., most preferably about 41 to about 45 lbs/cu. ft. The manufacture of cores of predetermined densities can be effected by using known techniques, for example, by introducing an appropriate amount of foam into the aqueous gypsum slurry from which the core is formed. There are weight advantages that can be realized by the use of fibrous mat-faced gypsum board in that fibrous mats which are lighter in weight than conventional paper facing are available. For example, the weight of a widely used paper facing in the manufacture of conventional gypsum sheathing is in the range of about 120 lbs/1000 sq. ft. of board, whereas the weight of a preferred form of glass fiber mat for use in the present invention is about 40 lbs/1000 sq. ft. of board.

Turning now to a description of the finishing material, for use in exterior systems, the material should have good weathering characteristics, that is, it should resist being degraded by outdoor elements, for example, precipitation, rays of the sun and wind. Examples of such finishing material include synthetic resinous materials, rubber membranes, asphalt, and alternating layers of asphalt and roofing felt. Crushed stone or gravel is usually added as a topping to asphalt coatings.

When the exterior finishing system comprises a poured-in-place roof deck, application of the exterior finishing material such as asphalt and roofing felt is preceded by application of a settable cementitious material over the fibrous mat-faced gypsum board. An example of such settable cementitious material is a calcium sulfate, fibered concrete sold by Georgia-Pacific Corporation as "METRO MIX brand calcium sulphate". This material comprises a dry mixture of calcium sulfate hemihydrate in a dry weight amount of 97 wt. % and wood chips in a dry weight amount of about 3%. Water is mixed with the dry ingredients of the METRO MIX product to form an aqueous slurry having an average testing consistency of 56 using standard consistency tests available to those in the gypsum art.

Insulating material is advantageously used in exterior systems in underlying relationship to the finishing material. Presently, the most popularly used insulating material in exterior systems, including roof deck systems, is expanded or foamed polystyrene, a material which has good moisture resistant properties. Although it has desirably low water vapor transmission, it is not a vapor barrier, but instead is capable of breathing. Rigid panels of expanded polystyrene are used most widely in roof deck systems. Such panels have satisfactory compressive strength and resilience and are presently available in thicknesses ranging from ½ to 6 inches, widths from 6 to 48 inches and lengths ranging from 4 feet to 16 feet. One commercially available system utilizes rigid, expanded polystyrene panels which are 4'×8'×1".

Other thermal insulating materials can be used also. Examples of such materials include extruded polystyrene, polyurethane, isocyanurate, cement-based insulating plasters, and phenolic foam. Insulating materials generally have low thermal conductivity and low density.

In exterior systems, the fibrous mat-faced, water-resistant gypsum board can be affixed to an underlying support member in any suitable way, for example, by the use of nails or screws. In such systems, the underlying support member may comprise, for example, panels of rigid plastic or metal sheets, for example, in corrugated form, purlins and sub-purlins. Panels of insulating material may be affixed to such support members and underlie panels of said gypsum board which are affixed thereto. The support member is typically affixed to the frame of the building.

The fibrous mat-faced, water-resistant gypsum board can be used also to good advantage in other types of exterior applications, including those in which it replaces conventional gypsum sheathing. Thus, the board can be used as an underlying support surface which is covered with overlying finishing materials, for example, aluminum, wood siding, plaster, Portland cement stucco, and brick. As described in the aforementioned '874 application, it can be used also in EISystems.

The finishing material for use in interior systems should have durability characteristics and be preferably appealing in appearance. The most widely used interior finishing material is plaster. Especially suitable for use in the present invention are the so-called thin coat or veneer plasters. An example of one such plaster is sold by Georgia-Pacific Corporation under the trademark "DENS-COTE". An example of a plaster made from such a product is described in the table below.

| Ingredients | Wt. % of Dry Ingredients |
| --- | --- |
| calcined calcium sulfate | 46.15 |
| sand | 24.9 |
| refined kettle calcined calcium sulfate | 22.5 |
| lime | 6.24 |
| sodium citrate | 0.18 |
| hydroxy propyl methyl cellulose | 0.05 |
| water | 38 parts water to 100 parts dry mix |

Numerous other interior finishing plasters are known for interior surfacing of walls, ceilings, and the like. A number of these are described in the Georgia-Pacific brochure entitled "Plaster Products DENS-COTE Veneer Lath and Plaster", mentioned hereinabove.

The interior finishing material can vary in thickness, as desired, minimum exemplary thicknesses being about 1/16" to about ¼". Preferably, the plaster finish comprises a mono-layer of plaster; however, multi-layers of plaster can be used also, applied in thicknesses in excess of ¼". In interior systems, the fibrous mat-faced, water-resistant gypsum board can be affixed to an underlying support member in any suitable way, for example, by the use of mechanical fasteners such as nails and screws. The underlying support member can comprise a wooden or metal frame which includes studs. In some applications, the panels of the board may be affixed directly to the interior surface of an inside wall, for example, one comprising cinder blocks or concrete blocks. In new construction, the board is typically affixed directly to the frame of the building.

Figure 10:
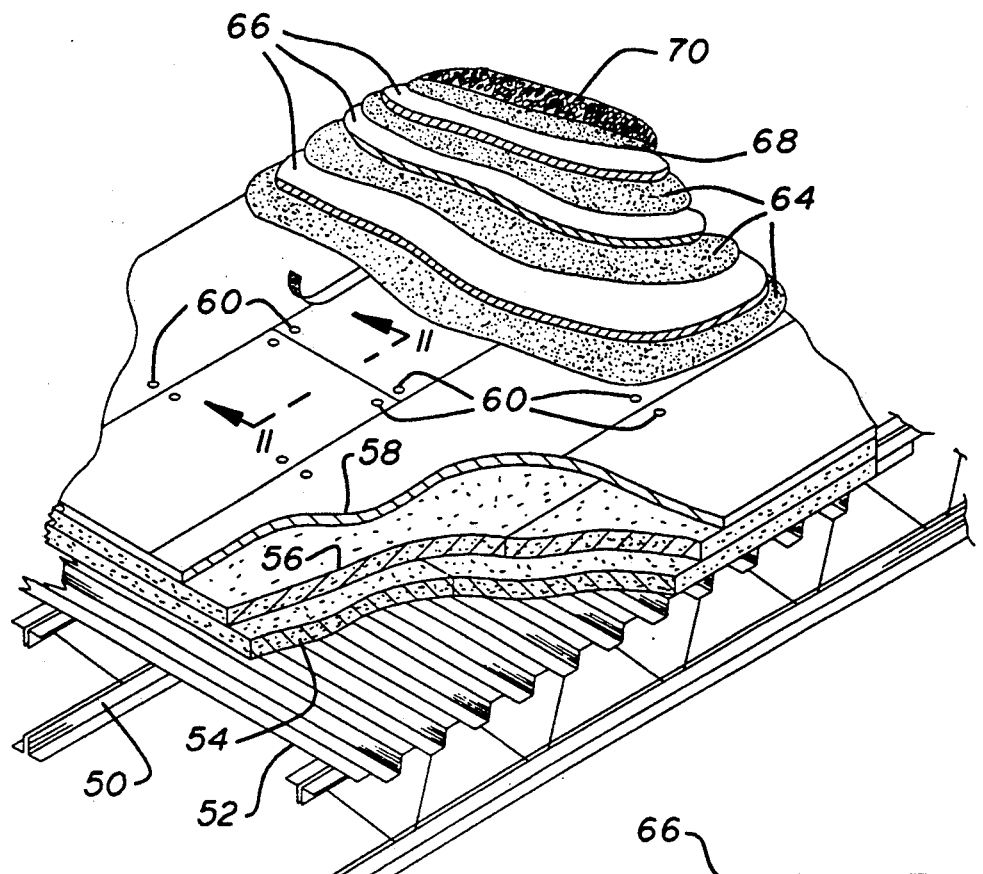
FIG. 10 is a perspective view partly broken away and in section of an exemplary roof deck system incorporating a panel in accordance with the invention.
Figure 11:
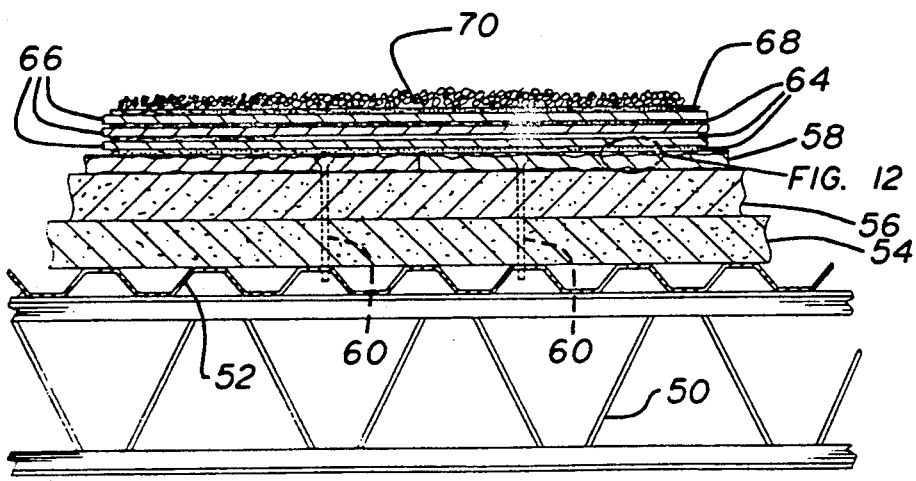
FIG. 11 is an enlarged sectional view taken along line 11—11 of FIG. 10.

A typical roof deck system incorporating the fibrous mat-faced gypsum board as described above is shown in FIGS. 10 to 12. In this construction, spaced parallel trusses 50 extending between building support members (not shown) support a corrugated metal deck 52 which is welded or otherwise fastened to the trusses. Layers 54 and 56 of insulating sheet material, which may, for example, be of expanded polystyrene, are disposed on the corrugated metal deck. A layer 58 of fibrous mat-faced gypsum board panels of the type described hereabove are secured to the corrugated deck 52 by means of fasteners 60 passing therethrough and through the underlying insulation layers 54 and 56 into the deck 52. The joints of the panel layer 58 are sealed by application of tape 62, as shown in FIG. 10 with respect to one of the panel joints. Overlying the gypsum layer 58 is a waterproof roofing membrane comprising alternate layers of asphalt 64 and roofing felt 66, three layers of each being shown in the present example. A final coating of asphalt 68 is covered with a crushed gravel topping layer 70.

Figure 12:
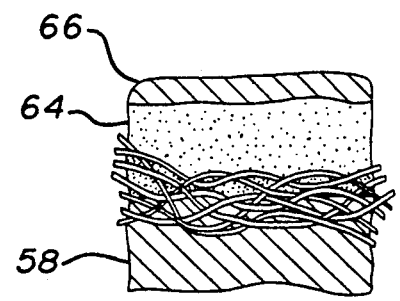
FIG. 12 is a greatly enlarged sectional view of the circled area of FIG. 11 showing the penetration of the first asphalt layer into the fibrous upper surface of the panel in accordance with the invention.

In the enlarged view of FIG. 12, the manner in which the first asphalt layer 64 penetrates into the upwardly facing fibrous mat-face of the gypsum board panel layer 58 is illustrated. This penetration assures a secure adhesion of the waterproof membrane to the structural layers of the roof system.

Referring to FIGS. 13 and 14, a poured-in-place roof deck system is shown comprising purlins 72 supporting spaced sub-purlins (bulb tees 74 in parallel spaced relation). Fibrous mat-faced gypsum board panels 76 of the type described above are supported on the horizontal flanges 74a of the sub-purlins 74. A reinforcing mesh screen 78 is laid over the sub-purlins and gypsum board panels 76 and a layer of settable cementitious slurry 80 is poured in place over the reinforcing mesh. The slurry 80 is allowed to harden to form a smooth continuous deck surface 82. Adhesion of the slurry to the gypsum board panel 76 is assured by the penetration of the slurry into the upwardly facing fibrous mat surface of the panels. A roofing membrane comprising alternate layers of asphalt 84 and roofing felt 86, three layers of each in the illustrated example, is applied to the surface 82. A final layer of asphalt 88 is covered with a coating of crushed rock or gravel 90.

An example of an interior usage of the present fibrous mat-faced panel is illustrated in FIGS. 15 and 16. In these views, an interior wall system comprises spaced vertical studs 92 to which fibrous mat-faced gypsum board panels 94 in accordance with the invention are attached by spaced fasteners 96 such as screws or nails. A thin layer 98 of plaster is applied to the fibrous mat surface 100 of the panel 94 and is troweled to form a smooth finish surface which may then be decorated by paint, paper or the like in a conventional manner. As shown in the enlarged view of FIG. 16, the plaster 98 penetrates into the fibrous mat surface of the panel 94 to effect a secure mechanical bond of the plaster layer to the panel. Although shown in the context of a wall in FIG. 15, the panel 94 may equally suitably be used as a ceiling panel and can be used with either a wood or metal stud support system. For some applications, it may be found that adjustments need to be made in the water-resistant properties of the core in order to obtain a satisfactory plaster finish. For example, it may be found expedient to adjust the amount of the water-resistant additive(s) in the core in a manner such that the water absorbancy of the core (as determined according to the aforementioned ASTM C-473) is 10% or greater, for example, up to about 20%.

EXAMPLES

Example No. 1

The formulation set forth below is an example of a preferred aqueous gypsum slurry which can be used in making the core of a gypsum support member for use in an exterior or interior finishing system.

| Constituents | Lbs./1000 sq.ft. of board |
|---|---|
| calcined gypsum ($CaSO_4 \cdot \frac{1}{2}H_2O$) | 1380 |
| wax/asphalt emulsion | 130 |
| aqueous solution of 10 wt % poly(vinyl alcohol) | 56 |
| paper fiber | 15 |
| set accelerator | 6 |
| ammonium lauryl sulfonate (foaming agent) | 1 |
| calcium lignosulfonate (dispersing agent) | 2 |
| water | |

The wax/asphalt emulsion used in the above formulation contained approximately 48 wt. % solids of which about 11 wt. % was paraffin wax and about 37 wt. % was asphalt. The set accelerator comprised about 80 wt. % potash, about 12 wt. % lignosulfonate and about 8 wt. % ground gypsum.

The above formulation was used to prepare gypsum board, the surfaces of which were covered with nonwoven fiber glass mat. The mat was composed of glass fiber filaments oriented in a random pattern bonded together by an adhesive referred to by the manufacturer as a "modified urea-formaldehyde resin". The mat had a thickness of 33 mils and was more porous than paper of the type used as the cover sheet of gypsum wallboard. The air permeability of the mat was 700 CFM/sq. ft. (test method FG 436-910). The mat is available commerically as DURA-GLASS brand glass mat 7502-2 lbs. and is an example of a preferred fibrous mat for use in the practice of the present invention.

Continuous length board was made from the above gypsum slurry and glass fiber mat on a conventional wallboard machine. The slurry was fed onto a moving sheet of the mat as it was unrolled from a roll onto a moving support surface. The mat had a width of about 51 inches and was scored continuously by conventional scoring blades prior to the deposition of the slurry thereon. Each edge of the mat was scored with two score marks, with each of the outer scores being about 1 inch from its respective edge of the mat and each of the inner scores being about 1½ inch from its respective edge. After the slurry was deposited on the mat, the edges were folded at the score marks and overlapped on top of the slurry. (The gypsum core formed from this operation had a width of 47⅞ inches and a thickness of ½ inch.) Mat from another roll thereof and having a width of 47½ inches was fed onto the top of the gypsum slurry and the overlapped edge portions of the underlying mat. The gypsum slurry penetrated the overlapped edge portions and served to bond the edge portions of the overlying mat to the overlapped edge portions of the underlying mat.

The viscosity of the gypsum slurry was about 5900 cp at 70° F. At this viscosity, the slurry penetrated substantially through some portions of the underlying mat to form a thin film thereof on about 40 to 50% of the area of the outer surface of the mat. As the gypsum in the film set, substantial portions of the outer surface of the mat were covered with a thin film of set gypsum. The surface had a roughened appearance with outlines of the glass filaments being observable underneath the thin coatings of gypsum which covered them. However, at the aforementioned viscosity, the slurry penetrated but a portion (about 5 mils) of the thickness of the overlying mat over the entire area thereof, with no slurry being observed on the outer surface of the mat. As the gypsum set in the intermediate portions of the mat that were penetrated by the slurry, it formed a bond that included a mechanical interlock with the set gypsum core.

The continuous length board is cut into lengths of about 8, 10 or 12 feet. Drying of the gypsum board is accelerated by heating in an oven at 350° F. for about 2 hours and until the board is almost dry and then at 200° F. for about 1 hour until it is dried completely. The density of the board is about 43 lb./cu. ft.

Glass fiber-faced gypsum boards, made as described above, and with their edges protected, were placed outdoors for several months and exposed to the elements. During that period, the boards were examined and found to be in excellent condition with no signs of deterioration. Other outdoor tests have shown that glass fiber mat-faced gypsum board having a core which includes wax-asphalt emulsion as a water-resistant additive better resists deterioration than a like board having a core which includes sodium methyl soliconate as the water-resistant additive.

Board of Example 1 above can be used advantageously pursuant to the present invention in exterior and interior finishing systems particularly of the type in which it is not deemed important for the board to have relatively high fire-resistant properties. For use in systems where it is considered important for the board to have relatively high fire-resistant properties, (as well as good water-resistant properties), the board of Example No. 2 below is exemplary. The Board of Example No. 2 is a ⅝" thick glass fiber mat-faced gypsum board having a core composition as set forth below and prepared according to the technique described for glass fiber mat-faced gypsum board of Example No. 1 above.

| Components | Wt. %, set & dried board |
| --- | --- |
| glass fiber mat facing | 1.58 |
| calcium sulfate dihydrate | 94.06 |
| glass fiber (¾" chopped glass roving) | 0.08 |
| paper fiber | 0.74 |
| potash (accelerator) | 0.15 |
| wax-asphalt | 2.96 |
| poly (vinyl alcohol) | 0.28 |
| calcium lignosulfonate (dispersing agent) | 0.11 |
| ammonium lauryl sulfonate (foaming agent) | 0.004 |

The density of the core of the board was 53 lbs/cu. ft. A fire rating of 1 hour and 30 seconds was achieved when the board was evaluated for fire resistance and hose stream resistance according to ASTM E-119. It is noted that the board has excellent water-resistant properties due to the use of water-resistant additives in its core, those additives being wax-asphalt emulsion and poly(vinyl alcohol).

It should be understood that gypsum board as described herein can be used in applications other than the specific ones described hereinabove. For example, such gypsum board can be used to excellent advantage in mobile homes, that is, prefabricated or manufactured housing of the type wherein buildings, usually dwellings, are manufactured in a factory, including, for example, in sections which are transported to site and assembled to form a finished building. In such systems, it is particularly desirable that gypsum board used in forming the walls and ceilings of the mobile home be light in weight to reduce transportation costs and be resistant to sagging, as tends to occur when veneer plasters and textured interior finishes are applied thereto. Such overlying finishes are typically applied by spraying.

When evaluated for sag or humidified deflection according to ASTM C-473, one type of commercially available, paper-faced ⅜" thick gypsum board shows a humidified deflection of 10/8". A similar ⅜" board shows a humidified deflection of 15/8". It is noted that conventional gypsum board, the core of which includes water-resistant additives fares even worse in humidified deflection tests than the aforementioned commercially available gypsum boards.

On the other hand, when a ⅜" thick glass mat-faced board having a core composition according to Example 1 herein is tested according to ASTM C-473, the board shows a humidified deflection measurement of less than ⅜". Such board or one having a thickness of 5/16", a preferred thickness for use in mobile homes, can be used effectively in mobile home applications.

It is noted that the compositions of the examples included the use of calcium sulfate hemihydrate to form the set gypsum product. Alternatively, there can be used calcium sulfate, the term used in the claims to cover generically both soluble anhydrous calcium sulfate and calcium sulfate hemihydrate.

In summary, it can be said that the present invention provides improvements in exterior and interior finishing systems, including systems which are in relatively wide use in industry. The improvements are provided in a practical way which promotes their being adopted readily, thereby helping to assure that the benefits of the invention are realized by the installers and users of the systems.

What is claimed is:

1. Gypsum board comprising a set gypsum core faced with a fibrous mat, the gypsum core including one or more additives which are effective in simultaneously improving the water resistance and fire resistance properties of the board in an amount at least sufficient to impart to the board improved water resistance and fire resistance properties.

2. The gypsum board of claim 1, wherein said fibrous mat contains glass fibers.

3. The gypsum board of claim 1, wherein said core contains sufficient water-resistant additive for absorbing less than about 10% water in an ASTM C-473 test.

4. The gypsum board of claim 1, wherein said water-resistant additive comprises organohydrogenpolysiloxane.

5. The gypsum board of claim 3, wherein said core includes a fire-resistant additive which enables said board to achieve an ASTM E-119 fire rating of at least about 1 hour.

* * * * *

UNITED STATES PATENT AND TRADEMARK OFFICE
CERTIFICATE OF CORRECTION

PATENT NO. : 5,319,900

DATED : June 14, 1994

INVENTOR(S) : Charles W. Lehnert and Brian G. Randall

It is certified that error appears in the above-identified patent and that said Letters Patent is hereby corrected as shown below:

Column 17, line 49, change "0.004" to --0.04--.

Signed and Sealed this

Twentieth Day of December, 1994

*Attest:*

BRUCE LEHMAN

*Attesting Officer*  *Commissioner of Patents and Trademarks*